(12) United States Patent
Hann et al.

(10) Patent No.: US 8,806,261 B2
(45) Date of Patent: Aug. 12, 2014

(54) METHOD AND A DEVICE FOR CONTROLLING A CLOCK SIGNAL GENERATOR

(75) Inventors: Kenneth Hann, Espoo (FI); Mikko Laulainen, Helsinki (FI); Heikki Laamanen, Espoo (FI); Jonas Lundqvist, Espoo (FI)

(73) Assignee: Tellabs Oy, Espoo (FI)

(*) Notice: Subject to any disclaimer, the term of this patent is extended or adjusted under 35 U.S.C. 154(b) by 288 days.

(21) Appl. No.: 13/419,478

(22) Filed: Mar. 14, 2012

(65) Prior Publication Data

US 2012/0239962 A1    Sep. 20, 2012

(30) Foreign Application Priority Data

Mar. 14, 2011  (FI) ...................................... 20115249

(51) Int. Cl.
| | | |
|---|---|---|
| G06F 1/00 | (2006.01) | |
| G06F 1/12 | (2006.01) | |
| H04J 3/06 | (2006.01) | |
| H04B 1/38 | (2006.01) | |
| H04L 7/00 | (2006.01) | |
| H04L 7/08 | (2006.01) | |

(52) U.S. Cl.
CPC *H04J 3/0664* (2013.01); *H04L 7/08* (2013.01)
USPC ........... 713/500; 713/400; 370/503; 375/219; 375/354; 455/73

(58) Field of Classification Search
CPC ................................ H04J 3/0661; G06F 1/12
USPC ........... 713/400, 500; 370/503; 375/219, 354; 455/73
See application file for complete search history.

(56) References Cited

U.S. PATENT DOCUMENTS

| 6,148,049 A | 11/2000 | Hein |
|---|---|---|
| 6,449,291 B1 | 9/2002 | Burns et al. |

(Continued)

FOREIGN PATENT DOCUMENTS

| EP | 1 294 116 A2 | 3/2003 |
|---|---|---|
| EP | 1931069 A2 | 6/2008 |

(Continued)

OTHER PUBLICATIONS

Finnish Search Report, dated Nov. 11, 2011, from corresponding Finnish application.

(Continued)

*Primary Examiner* — Stefan Stoynov
(74) *Attorney, Agent, or Firm* — Young & Thompson (57) ABSTRACT

A device for controlling a clock signal generator includes a processor (101) for forming at least two mutually different control quantities on the basis of reception moments of timing messages such as time stamps, where the reception moments are expressed as time values based on a first clock signal and the timing messages are transmitted in accordance with a second clock signal. The processor also calculates a weighted sum of the control quantities, and controls the clock signal generator with the weighted sum so as to synchronize the first clock signal and the second clock signal. The control quantities may represent, for example, a filtered value of observed phase-errors, a phase-error corresponding to a minimum observed transfer delay, and phase-errors corresponding to a given portion of the delay distribution. Using the weighted sum of the mutually different control quantities improves the utilization of the information content of the timing messages.

33 Claims, 3 Drawing Sheets

(56) References Cited

U.S. PATENT DOCUMENTS

| | | | |
|---|---|---|---|
| 7,020,791 | B1 | 3/2006 | Aweya et al. |
| 7,656,985 | B1 | 2/2010 | Aweya et al. |
| 8,073,060 | B2 * | 12/2011 | Compton et al. ........ 375/240.28 |
| 8,275,087 | B2 * | 9/2012 | Hadzic et al. ................. 375/376 |
| 8,428,045 | B2 * | 4/2013 | Gelter et al. ................... 370/350 |
| 8,432,942 | B1 * | 4/2013 | Algie et al. ................... 370/516 |
| 2004/0264477 | A1 | 12/2004 | Repko et al. |
| 2008/0049743 | A1 | 2/2008 | Zampetti |

FOREIGN PATENT DOCUMENTS

| | | |
|---|---|---|
| EP | 2209239 A2 | 7/2010 |
| GB | 2454936 A | 5/2009 |
| WO | 2007/117756 A2 | 10/2007 |

OTHER PUBLICATIONS

Extended European Search Report, dated Jul. 11, 2012, from corresponding EP application.

* cited by examiner

METHOD AND A DEVICE FOR CONTROLLING A CLOCK SIGNAL GENERATOR

FIELD OF THE INVENTION

The invention relates to a method and a control device for controlling a clock signal generator so as to generate a clock signal that is synchronized with a reference clock signal. Furthermore, the invention relates to a computer program for controlling a clock signal generator so as to generate a clock signal that is synchronized with a reference clock signal. Furthermore, the invention relates to network element, e.g. a router or a switch, of a data transfer network.

BACKGROUND

Data transfer networks include network elements such as, for example, routers, switches, and terminal devices which communicate with each other via data transfer links between the network elements. In many data transfer networks, there is a need to achieve phase or at least frequency synchronization between clock signals prevailing at various network elements of a data transfer network. The network elements can be configured to constitute master-slave pairs in order to distribute phase or at least frequency information within a data transfer network. Each slave network element controls its clock signal generator so that a reference clock signal prevailing at the corresponding master network element is regenerated in the slave network element on the basis of timing messages transferred from the master network element to the slave network element. The timing messages can be time-stamps contained by protocol data units "PDU" that can be, for example, data packets or data frames. Each time-stamp indicates the instantaneous time value at the transmission moment of the respective protocol data unit containing the time-stamp under consideration, where the time value is based on the reference clock signal available at the master network element. The timing messages can be timing packets that are transmitted so that the time interval between transmission moments of two successive timing packets is constant, or otherwise known, when being measured with the reference clock signal available at the master network element. It is also possible that one or more time-stamps indicating the transmission moments of one or more timing messages are transferred in one or more data packets transmitted after the one or more timing messages. It is also possible that the timing information indicating the phase or at least frequency difference between the reference clock signal and the regenerated clock signal is derived not only from timing messages, e.g. time stamps or timing packets, transferred from the master network element to the slave network element but also from timing messages transferred in the opposite direction from the slave network element to the master network element. The use of the timing messages transferred from the slave network element to the master network element requires, however, an additional data transfer from the master network element to the slave network element.

The timing messages, e.g. the time stamps or the timing packets, may be received at a slave network element from several master network elements, i.e. from several timing sources, each of which having an own reference clock signal. US2008/0049743 teaches to make a selection between different timing sources on the basis of Allan Variance estimators which are indicators of frequency stability. US2008/0049743 does not, however, teach any technical solution for improving the utilization of the information content of a single flow of timing messages.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention there is provided a new method for controlling a clock signal generator. The method comprises:
  forming at least two mutually different control quantities on the basis of reception moments of timing messages, the reception moments being expressed as time values based on a first clock signal and the timing messages being transmitted in accordance with a second clock signal,
  calculating a weighted sum of the at least two control quantities, and
  controlling the clock signal generator with the weighted sum of the control quantities so as to achieve synchronization between the first clock signal and the second clock signal.

The at least two mutually different control quantities are formed in mutually different ways. A first one of the at least two control quantities can be, for example but not necessarily, a mean of phase-errors indicated by reception moments of all timing messages, e.g. time stamps or timing packets, received within a time window which can be a sliding or stepping time window. A second one of the at least two control quantities can be, for example but not necessarily, a phase-error indicated by a reception moment of the particular timing message that relates to the smallest data transfer delay from among timing messages received within a sliding or stepping time window, i.e. this control quantity is the smallest phase-error as a signed value selected from among the phase-errors indicated by the timing messages received within the sliding or stepping time window. A third one of the at least two control quantities can be, for example but not necessarily, a phase-error indicated by a most recent timing message which relates to a predetermined portion of the probability distribution of the data transfer delay. The predetermined portion of the probability distribution may represent e.g. such a sub-range of the range of variation of the transfer delay that a certain portion, e.g. p %, of all the timing messages relate to a smaller transfer delay than the upper limit of the said sub-range and the rest of the timing messages, e.g. 100-p %, relate to a greater or equal transfer delay than the upper limit, or that a first portion, e.g. $q_1$%, of all the timing messages relates to a smaller transfer delay than the lower limit of the said sub-range and a second portion, e.g. $q_2$%, of all the timing messages relates to a greater transfer delay than the upper limit of the said sub-range, e.g. a $q_1$% ... 100-$q_2$% band. The phase-error related to a timing message can be a difference between the reception moment of the respective timing message and an ideal reception moment determined for that timing message, where the ideal reception moment can be a sum of a constant phase-offset and a time-stamp value carried by the timing message or the ideal reception moments can be temporally spaced at equal time intervals so that a time difference between any two successive ideal reception moments is a pre-determined constant. In some applications, it is also possible to use an inter-arrival time of successive timing messages as a basis of one or more of the control quantities, where the inter-arrival time is measured with the clock signal available at the receiving end.

Using the weighted sum of the control quantities derived in different ways from the reception moments of the timing messages improves the utilization of the information content of a single flow of timing messages.

A method according to an advantageous, non-limiting embodiment of the invention comprises the following actions for further optimizing the utilization of the above-mentioned information content:

measuring a noise quantity for each of the control quantities, each noise quantity indicating amount of the fluctuation in the related control quantity, and determining weights of the weighted sum on the basis of the noise quantities so that a greater weight corresponds to a smaller noise quantity and a smaller weight corresponds to a greater noise quantity.

In accordance with the second aspect of the invention there is provided a new control device for controlling a clock signal generator. The control device comprises a processor configured to:

form at least two mutually different control quantities on the basis of reception moments of timing messages, the reception moments being expressed as time values based on a first clock signal and the timing messages being transmitted in accordance with a second clock signal, calculate a weighted sum of the at least two control quantities, and control the clock signal generator with the weighted sum of the control quantities so as to achieve synchronization between the first clock signal and the second clock signal.

The control device can be a part of a network element, e.g. a router or a switch, of a data transfer network. It is also possible that the control device is a separate apparatus that is connected to a network element.

In accordance with the third aspect of the invention there is provided a new network element that comprises at least one egress port and at least one ingress port for connecting to a data transfer network, a controllable clock signal generator, and a processor configured to:

form at least two mutually different control quantities on the basis of reception moments of timing messages, the reception moments being expressed as time values based on a first clock signal and the timing messages being transmitted in accordance with a second clock signal, calculate a weighted sum of the at least two control quantities, and control the clock signal generator with the weighted sum of the control quantities so as to achieve synchronization between the first clock signal and the second clock signal.

The first clock signal can be a clock signal generated with the clock signal generator that is controlled and the second clock signal can be a reference clock signal prevailing at another network element which transmits the timing messages to this network element. It is also possible that the timing messages are transmitted in the opposite direction from this network element to the other network element. In this case, the second clock signal is the clock signal generated with the clock signal generator that is controlled, the first clock signal is the reference clock signal prevailing at the other network element which receives the timing messages, and this network element is configured to receive information about the reception moments of the timing messages expressed as time values based on the first clock signal that is, in this case, the reference clock signal. The above-described principles can be combined so that there is a first flow of timing messages from the other network element to this network element and a second flow of timing messages in the opposite direction from this network element to the other network element. The control quantities can be formed for both of the above-mentioned first and second flows of timing messages, a weighted sum of all the control quantities can be calculated, and the clock signal generator can be controlled with the weighted sum of all the control quantities. It is also possible that the network element receives and/or transmits timing messages from and/or to several other network elements each of which having an own reference clock signal. In this case, the above-described principles can be applied so that the control quantities are formed for all flows of timing messages, a weighted sum of all the control quantities is calculated, and the clock signal generator is controlled with the weighted sum of all the control quantities.

In accordance with the fourth aspect of the invention there is provided a new computer program for controlling a clock signal generator. The computer program comprises computer executable instructions for controlling a programmable processor to:

form at least two mutually different control quantities on the basis of reception moments of timing messages, the reception moments being expressed as time values based on a first clock signal and the timing messages being transmitted in accordance with a second clock signal, calculate a weighted sum of the at least two control quantities, and control the clock signal generator with the weighted sum of the control quantities so as to achieve synchronization between the first clock signal and the second clock signal.

A computer program product according to the invention comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF FIGURES

The exemplifying embodiments of the invention and their advantages are explained in greater detail below with reference to the accompanying drawings, in which.

DESCRIPTION OF EXEMPLIFYING EMBODIMENTS

Figure 1:
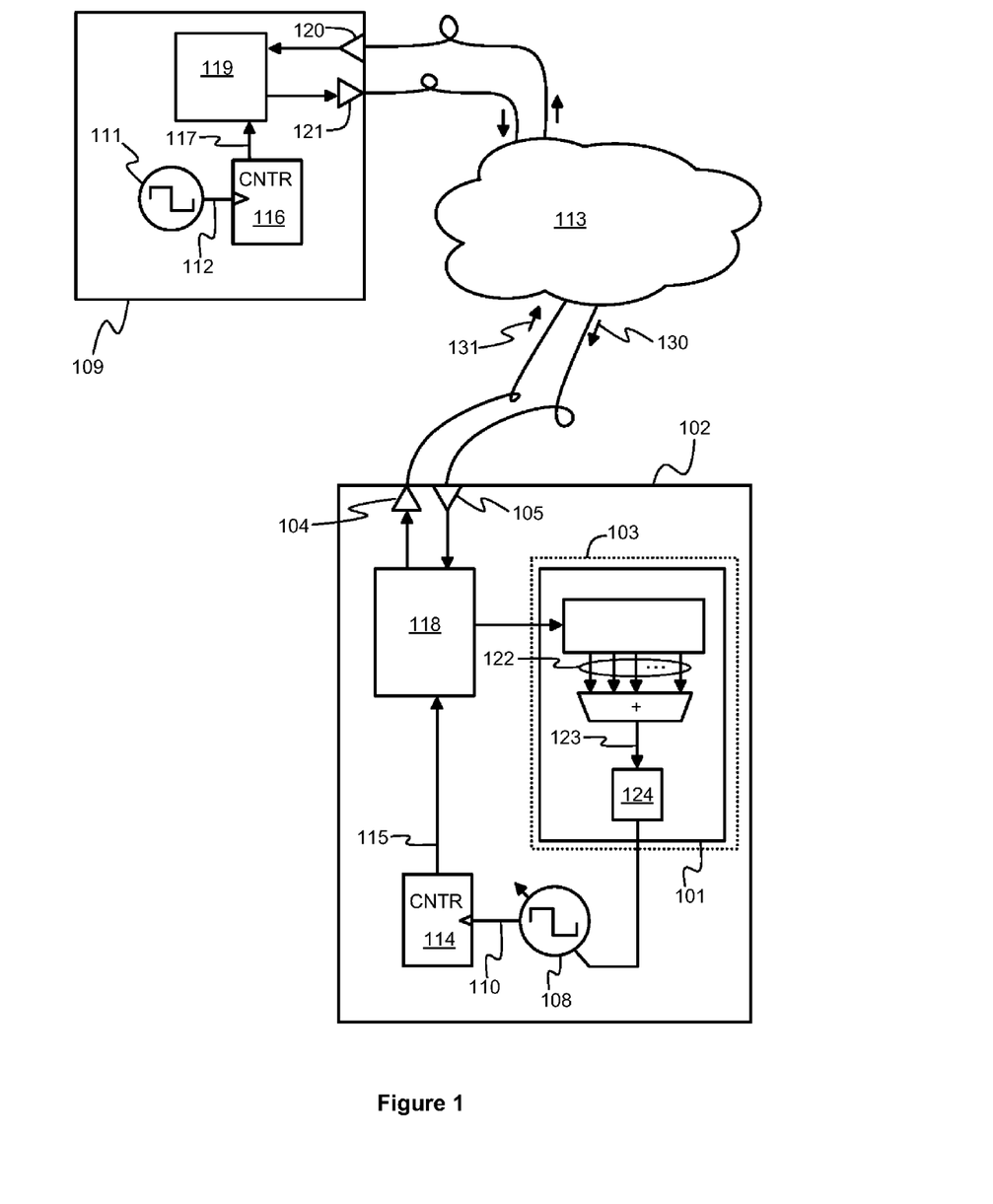
FIG. 1 shows a schematic illustration of an exemplifying data transfer system comprising a network element which is provided with a control device according to an embodiment of the invention for controlling a clock signal generator.

FIG. 1 shows a schematic illustration of an exemplifying data transfer system that comprises a network element 102 and a network element 109. The network elements 102 and 109 are connected to each other via a data transfer network 113 that may comprise several other network elements interconnected to each other via data transfer links. Each network element can be, for example, an Internet Protocol ("IP") router, an Ethernet switch, and/or a MultiProtocol Label Switching ("MPLS") switch. The network element 102 comprises a controllable clock signal generator 108 arranged to generate a clock signal 110. The network element 102 comprises a counter 114 arranged to generate a signal 115 that represents the clock time prevailing at the network element 102. The network element 102 comprises a processing system 118 for performing control- and forwarding plane operations related to data transfer protocols being used, e.g. IP, Ethernet, and/or MPLS. Furthermore, the network element 102 comprises at least one ingress port 105 and at least one egress port 104 for connecting to the data transfer network 113. The network element 109 comprises a clock signal generator 111 arranged to generate a reference clock signal 112. The network element 109 comprises a counter 116 arranged to generate a signal 117 that represents the clock time prevailing at the network element 109. The network element 109 comprises a processing system 119 for performing control- and forwarding plane operations related to the data transfer protocols being used. Furthermore, the network element 109 comprises at least one ingress port 120 and at least one egress port 121 for connecting to the data transfer network 113.

The network element 102 comprises a control device 103 according to an embodiment of the invention for controlling the clock signal generator 108. The control device 103 comprises a processor 101 configured to form at least two mutually different control quantities 122 on the basis of reception moments of timing messages, where the reception moments are expressed as time values based on a first clock signal and the timing messages are transmitted in accordance with a second clock signal. The processor 101 is further configured to calculate a weighted sum 123 of the at least two control quantities, and control the clock signal generator 108 with the weighted sum of the control quantities so as to achieve synchronization between the first clock signal and the second clock signal. The processor 101 is preferably further configured to carry out filtering 124 of the weighted sum and/or other signal processing operations directed to the weighted sum as part of the control of the clock signal generator 108.

In an exemplifying case, the network element 109 is arranged to transmit the timing messages to the network element 102 via the data transfer network 113. In this case, the above-mentioned first clock signal is the clock signal 110 and the above-mentioned time values expressing the reception moments of the timing messages are expressed by instantaneous values of the signal 115 at the reception times of the timing messages. The above-mentioned second clock signal, in accordance of which the timing messages are transmitted, is the reference clock signal 112.

In another exemplifying case, the network element 102 is arranged to transmit the timing messages to the network element 109 via the data transfer network 113. In this case, the above-mentioned first clock signal is the clock signal 112 and the above-mentioned time values expressing the reception moments of the timing messages are expressed by instantaneous values of the signal 117 at the reception times of the timing messages. The above-mentioned second clock signal, in accordance of which the timing messages are transmitted, is the clock signal 110. In this case, there is a need to transfer, from the network element 109 to the network element 102, information about the time values expressing the reception moments of the timing messages.

The principles illustrated in the above-described exemplifying cases can be combined so that there is a first flow 130 of timing messages from the network element 109 to the network element 102 and also a second flow 131 of timing messages in the opposite direction from the network element 102 to the network element 109. In this case, the processor 101 of the control device 103 is configured to carry out the forming of the control quantities for the first flow of the timing messages transferred towards the control device and transmitted in accordance with the clock signal 112 and also for the second flow of timing messages transferred in the opposite direction and transmitted in accordance with the clock signal 110. The processor is configured to calculate the weighted sum of all the control quantities and control the clock signal generator 108 with the weighted sum of all the control quantities.

In an embodiment of the invention, the processor 101 of the control device 103 is configured to calculate phase-error indicators on the basis of the reception moments of the timing messages and form the control quantities on the basis of the phase-error indicators, where each phase-error indicator is a difference between the reception moment of the respective timing message and an ideal reception moment of that timing message. An ideal reception moment of a given timing message can be defined to be, for example, a sum of a constant phase-offset and a time-stamp value carried by this timing message, where the time-stamp value is an instantaneous time value based on the second clock signal at the transmission moment of this timing message. In a case in which the timing messages are sent at a constant or otherwise pre-determined rate, it is not necessary to use the time-stamps but time values based on the first clock signal and spaced at constant or otherwise pre-determined intervals can be used as the ideal reception moments. In another embodiment of the invention, the processor 101 of the control device 103 is configured to calculate inter-arrival times of successive timing messages and use the calculated inter-arrival times as a basis of one or more of the control quantities, where the inter-arrival time is measured with the first clock signal, i.e. the clock signal available at the receiving end.

Different exemplifying ways to derive the control quantities 122 from the reception moments of the timing messages are described below. Using the weighted sum 123 of the control quantities derived in different ways from the reception moments of the timing messages improves the utilization of the information content of the timing messages.

In an embodiment of the invention, the processor 101 of the control device 103 is configured to filter a signal constituted by the temporally successive phase-error indicators with a digital filter that can be, for example, a finite impulse response filter ("FIR") or an infinite impulse response filter ("IIR") or a combination of them. An output quantity of the digital filter can be used as one of the control quantities. It is possible to derive two or more control quantities by using mutually different digital filters.

In an embodiment of the invention, the processor 101 of the control device 103 is configured to select, from among a predetermined number of successively received timing messages, a timing message that has the smallest phase-error indicator as a signed value and thereby the smallest estimated transfer delay between the network elements 102 and 109. The smallest phase-error indicator can be used as one of the control quantities. An advantage of using the smallest phase-error indicator as one of the control quantities is that this control quantity is almost free from disturbance caused by stochastic queuing delays related to network elements on the route of the corresponding timing message. The control quantity is totally free from the queuing delay disturbance, if the phase-error indicator is related to such a timing message that has experienced the smallest possible transfer delay between the network elements 102 and 109.

In an embodiment of the invention, a range of variation of the phase-error indicators is arranged to comprise one or more sub-ranges and each of the sub-ranges is related to a sub-range specific control quantity that is one of the control quantities. The processor 101 of the control device is configured to determine, concerning each timing message, whether the respective phase-error indicator belongs to any of the sub-ranges. The phase-error indicator is used for forming the appropriate sub-range specific control quantity in response to a situation in which the phase-error indicator belongs to the corresponding sub-range. The phase-error indicator as such can be used as the sub-range specific control quantity, or it can be used as an input quantity of a data processing operation, e.g. digital filtering, whose output quantity is the sub-range specific control quantity. The sub-ranges can be mutually non-overlapping in which case each phase-error indicator can belong to at most one of the sub-ranges, or two or more of the sub-ranges can be overlapping in which case it is possible that some phase-error indicators belong to two or even more sub-ranges.

In an embodiment of the invention, there are two mutually non-overlapping subranges and the limit value between the said sub-ranges is positioned so that a predetermined portion of the timing messages have phase-error indicators smaller than the limit value and the rest of the timing messages have phase-error indicators greater than or equal to the limit value. A phase-error indicator that is smaller than the limit value can be used as one of the control quantities. When the limit value is increased, a bigger portion of the phase-error indicators fulfil the condition of being smaller than the limit value and thereby the value of the control quantity is updated more frequently, but, on the other hand, the control quantity contains more disturbance caused by the stochastic queuing delays related to the network elements on the route of the corresponding timing messages. A compromise between the above-mentioned two viewpoints can be achieved by selecting a suitable limit value. It is possible to derive two or more control quantities by using mutually different limit values.

In an embodiment of the invention, the above-mentioned limit value between the said sub-ranges is adjusted so that the timing messages having the phase-error indicator smaller than the limit value represent a fixed portion, e.g. 5%, of all the timing messages. The processor 101 can be arranged to determine the limit value in an adaptive way e.g. according to the following algorithm:

Step 1: indicate the fixed portion by means of a number p (<1),

Step 2: set an initial value $R_0$ for the limit value R,

Step 3: wait for the next timing message,

Step 4: the limit value R is updated according to the rule $R = R_{old} + p\epsilon$, if the phase-error indicator $> R_{old}$, or according to the rule $R_{old} - (1-p)\epsilon$, if the phase-error indicator $< R_{old}$, where $\epsilon$ is a step size $> 0$, and Step 5: go back to Step 3.

In order to illustrate the above described algorithm, it is assumed that the phase-error indicator remains below the limit value R with a probability r, and surpasses the limit value R with a probability 1−r. Now, the expected value of the updated limit value is $$R + (1-r)p\epsilon - r(1-p)\epsilon = R + (p-r)\epsilon. \quad (1)$$

From the equation (1) it can be seen that the limit value R decreases, if too large a share of the phase-error indicators falls below the limit value R, i.e. r>p. Respectively the limit value R increases, if too small a share of the phase-error indicator falls below the limit value R, i.e. r<p. The rate of change of the limit value can be adjusted by means of the step size $\epsilon$. A suitable value for the step size $\epsilon$ can be found for example by experimenting.

In another embodiment of the invention, the above-mentioned limit value between the said sub-ranges is determined so that the smallest phase-error indicator, as a signed value, is selected from among phase-error indicators related to timing messages received during an observation interval and then the limit value is the selected smallest phase-error indicator with an added pre-determined constant.

In an embodiment of the invention, a stored minimum value is replaced with a phase-error indicator of a received timing message if the phase-error indicator is smaller, as a signed value, than the stored minimum value. The above-mentioned limit value between the said sub-ranges is the stored minimum value with an added pre-determined constant.

In an embodiment of the invention, a range of variation of the phase-error indicators is arranged to comprise a sub-range such that a first predetermined portion of the timing messages have phase-error indicators smaller than a lower limit of the sub-range and a second predetermined portion of the timing messages have phase-error indicators greater than an upper limit of the sub-range. A phase-error indicator that is on the band between the smaller and upper limits can be used as one of the control quantities. It is possible to derive two or more control quantities by using many mutually non overlapping sub-ranges.

In a control device according to an embodiment of the invention the processor 101 is further configured to:

measure a noise quantity for each of the control quantities, each noise quantity indicating amount of fluctuation in the related control quantity, and determine the weights of the weighted sum on the basis of the noise quantities so that a greater weight corresponds to a smaller noise quantity and a smaller weight corresponds to a greater noise quantity.

The noise quantity of a control quantity can be measured, for example, by high-pass filtering the control quantity and by calculating the power, e.g. the root-mean-square "RMS", of the high-pass filtered control quantity. The weight $w_k$ of the control quantity $c_k$ can be defined, for example, as:

$$w_k = \frac{\frac{1}{n_k}}{\sum_{i=1}^{N} \frac{1}{n_i}}, \qquad (2)$$

where $n_i$ is the noise quantity of the control quantity $c_i$, N is the number of the control quantities, and i and k are integers on the range 1 ... N. As can be seen from equation (2) the sum of the weights is unity.

In the exemplifying case illustrated in FIG. 1, the control device 103 is a part of a network element 102. It is also possible that the control device is a separate apparatus that is connected to the network element. The processor 101 of the control device may comprise one or more programmable processor units, one or more dedicated hardware circuits such as an application specific integrated circuit "ASIC", one or more field programmable logic circuits such as a field programmable gate array "FPGA", or a combination of these.

Figure 2:
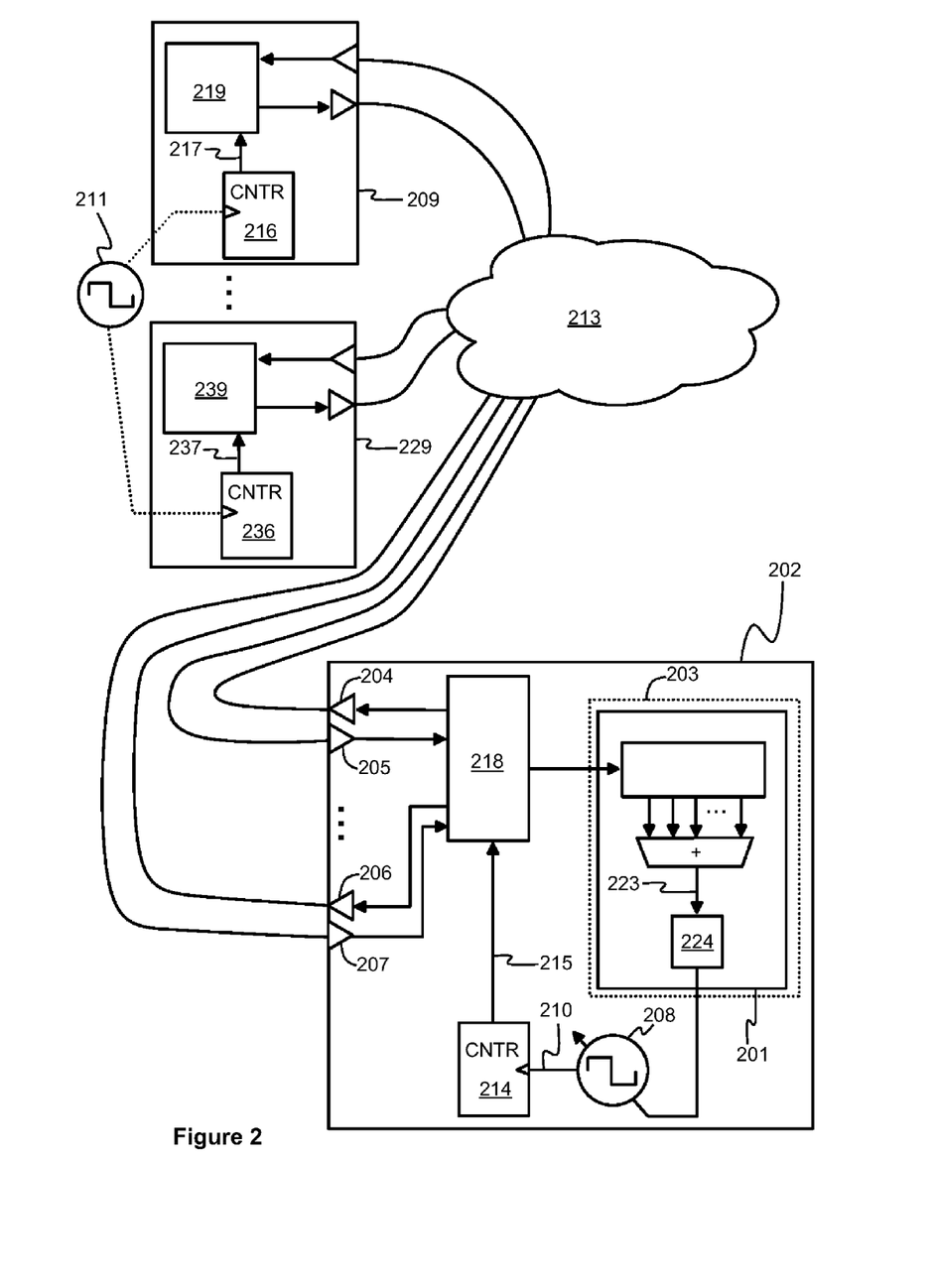
FIG. 2 shows a schematic illustration of an exemplifying data transfer system comprising a network element which is provided with a control device according to an embodiment of the invention for controlling a clock signal generator.

FIG. 2 shows a schematic illustration of an exemplifying data transfer system that comprises network elements 202, 209, and 229. The network elements 209 and 229 are connected to the network element 202 via a data transfer network 213 that may comprise several other network elements interconnected to each other via data transfer links. Each network element can be, for example, an Internet Protocol ("IP") router, an Ethernet switch, and/or a MultiProtocol Label Switching ("MPLS") switch. The network element 202 comprises a controllable clock signal generator 208 arranged to generate a clock signal 210. The network element 202 comprises a counter 214 arranged to generate a signal 215 that represents the clock time prevailing at the network element 202. The network element 202 comprises a processing system 218 for performing control- and forwarding plane operations related to data transfer protocols being used, e.g. IP, Ethernet, and/or MPLS. Furthermore, the network element 202 comprises one or more ingress ports 205, 207 and one or more egress ports 204, 206 for connecting to the data transfer network 213. The network elements 209 and 229 are arranged to receive a reference clock signal from a reference clock source 211 that can be e.g. a primary reference clock source "PRC". The network elements 209 and 229 comprise counters 216 and 236 arranged to generate signals 217 and 237 that represent the clock times prevailing at the network elements 209 and 229, respectively. The network element 209 and 229 comprise processing systems 219 and 239 for performing control- and forwarding plane operations related to the data transfer protocols being used. Furthermore, each of the network elements 209 and 229 comprises at least one ingress port and at least one egress port for connecting to the data transfer network 213.

The network element 209 is arranged to transmit first timing messages to the network element 202 via the data transfer network 213 and the network element 229 is arranged to transmit second timing messages to the network element 202 via the data transfer network 213. The first and second timing messages are transmitted from the network elements 209 and 229 in accordance with clock signals received from the reference clock source 211. The network element 202 is arranged to transmit third timing messages to the network element 209 and fourth timing messages to the network element 229 via the data transfer network 213. The third and fourth timing messages are transmitted from the network element 202 in accordance with the clock signal 210. The network element 209 is arranged to transfer, to the network element 202 via the data transfer network 213, information expressing the reception moments of the third timing messages at the network element 209. The information expressing the reception moments of the third timing messages comprise instantaneous values of the signal 217 at the reception times of the third timing messages. Correspondingly, the network element 229 is arranged to transfer, to the network element 202 via the data transfer network 213, information expressing the reception moments of the fourth timing messages at the network element 229. The information expressing the reception moments of the fourth timing messages comprise instantaneous values of the signal 237 at the reception times of the fourth timing messages.

The network element 202 comprises a control device 203 according to an embodiment of the invention for controlling the clock signal generator 208. The control device 203 comprises a processor 201 configured to form at least two mutually different first control quantities on the basis of the reception moments of the first timing messages, where the reception moments of the first timing messages are expressed by instantaneous values of the signal 215 at the reception times of the first timing messages. The processor 201 is configured to form at least two mutually different second control quantities on the basis of the reception moments of the second timing messages, where the reception moments of the second timing messages are expressed by instantaneous values of the signal 215 at the reception times of the second timing messages. The processor 201 is configured to form at least two mutually different third control quantities on the basis of the reception moments of the third timing messages and at least two mutually different fourth control quantities on the basis of the reception moments of the fourth timing messages. The processor 201 is further configured to calculate a weighted sum 223 of the first, second, third and fourth control quantities, and control the clock signal generator 208 with the weighted sum of the control quantities so as to achieve synchronization between the clock signal 210 and the reference clock signal provided by the reference clock source 211. The processor 201 is preferably further configured to carry out filtering 224 of the weighted sum and/or other signal processing operation directed to the weighted sum as a part of the controlling of the clock signal generator 208.

In a control device according to an embodiment of the invention, the processor 201 is further configured to:
measure a noise quantity for each of the first, second, third and fourth control quantities, each noise quantity indicating amount of fluctuation in the related control quantity, and
determine the weights of the weighted sum on the basis of the noise quantities so that a greater weight corresponds to a smaller noise quantity and a smaller weight corresponds to a greater noise quantity.

Figure 3:
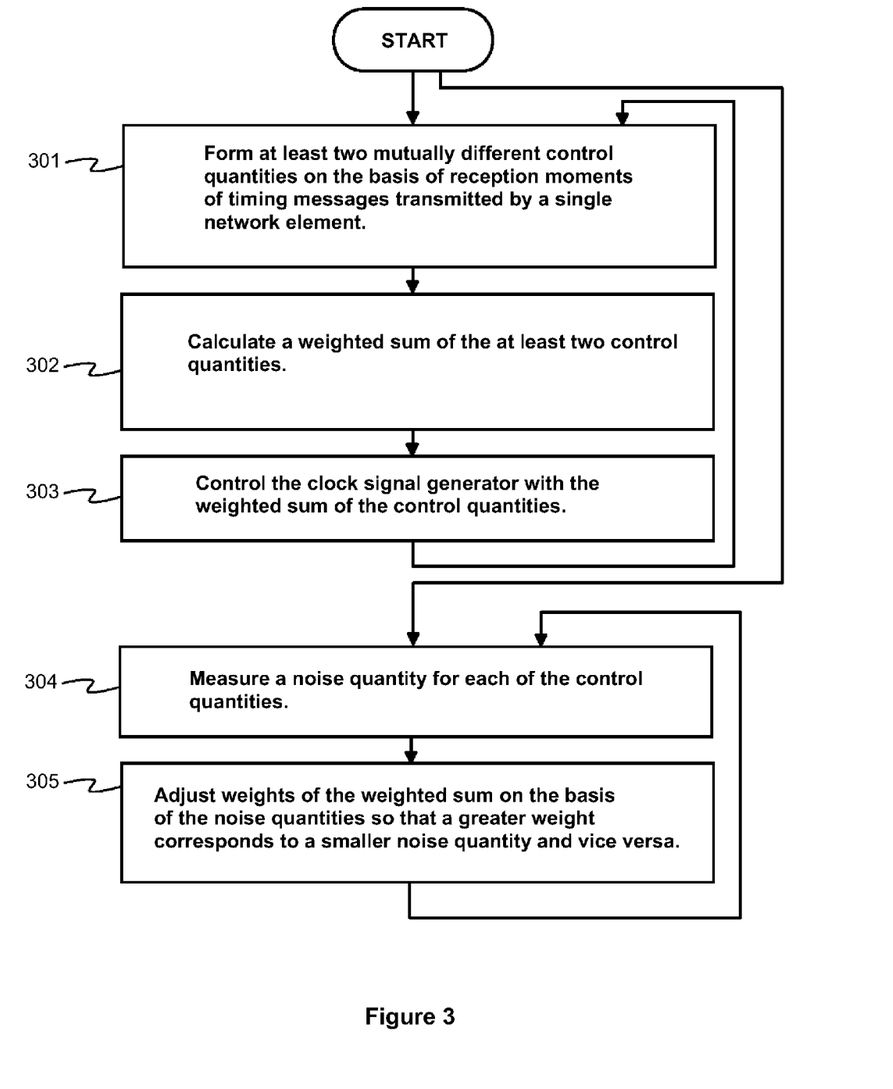
FIG. 3 shows a flow chart of a method according to an embodiment of the invention for controlling a clock signal generator.

FIG. 3 shows a flow chart of a method according to an embodiment of the invention for controlling a clock signal generator. The method comprises:
in a phase 301, forming at least two mutually different control quantities on the basis of reception moments of timing messages transmitted by a single network element, the reception moments being expressed as time values based on a first clock signal and the timing messages being transmitted in accordance with a second clock signal,
in a phase 302, calculating a weighted sum of the at least two control quantities, and
in a phase 303, controlling the clock signal generator with the weighted sum of the control quantities so as to achieve synchronization between the first clock signal and the second clock signal.

A method according to an embodiment of the invention further comprises:

in a phase 304, measuring a noise quantity for each of the control quantities, each noise quantity indicating amount of fluctuation in the related control quantity, and in a phase 305, determining or adjusting weights of the weighted sum on the basis of the noise quantities so that a greater weight corresponds to a smaller noise quantity and a smaller weight corresponds to a greater noise quantity.

In a method according to an embodiment of the invention, the first clock signal is generated with the clock signal generator being controlled and the second clock signal is a reference clock signal prevailing at the network element which transmits the timing messages.

In a method according to another embodiment of the invention, the second clock signal is generated with the clock signal generator being controlled and the method further comprises transmitting the timing messages and receiving information about the reception moments of the timing messages expressed as time values based on the first clock signal that is a reference clock signal prevailing at another network element that receives the timing messages.

A method according to an embodiment of the invention comprises carrying out the forming of the control quantities for a flow of the timing messages transmitted from a master network element to a slave element in accordance with the second clock signal and also for another flow of timing messages transmitted in the opposite direction from the slave network element to the master network element in accordance with the first clock signal produced by the clock signal generator being controlled. The method further comprises calculating a weighted sum of all the control quantities and controlling the clock signal generator with the weighted sum of all the control quantities.

A method according to an embodiment of the invention comprises carrying out the forming of the control quantities for each of several flows of timing messages transferred between a slave network element and several master network elements. The method further comprises calculating a weighted sum of all the control quantities and controlling the clock signal generator with the weighted sum of all the control quantities.

A method according to an embodiment of the invention comprises calculating phase-error indicators on the basis of the reception moments of the timing messages and forming the control quantities on the basis of the phase-error indicators, where each phase-error indicator is a difference between the reception moment of the respective timing message and an ideal reception moment of that timing message. For example, a sum of a constant phase-offset and a time-stamp value carried by each timing message can be used as the ideal reception moment of that timing message. In a case in which the timing messages are sent at a constant or otherwise pre-determined rate, it is not necessary to use the time-stamps but time values based on the first clock signal and spaced at constant or otherwise pre-determined intervals can be used as the ideal reception moments.

A method according to an embodiment of the invention comprises filtering a signal constituted by the temporally successive phase-error indicators with a digital filter. An output quantity of the digital filter represents one of the control quantities.

A method according to an embodiment of the invention comprises selecting, from among a predetermined number of successively received timing messages, a timing message that has the smallest phase-error indicator as a signed value and thereby a smallest estimated transfer delay, and using the smallest phase-error indicator as one of the control quantities.

In a method according to an embodiment of the invention, a range of variation of the phase-error indicators comprises one or more sub-ranges each of which being related to a sub-range specific control quantity that is one of the control quantities. The method comprises determining, concerning each timing message, whether the respective phase-error indicator belongs to any of the sub-ranges, and using the phase-error indicator for forming the appropriate sub-range specific control quantity in response to a situation in which the phase-error indicator belongs to the corresponding sub-range.

In a method according to an embodiment of the invention, one of the sub-ranges is such that a predetermined portion of the timing messages have phase-error indicators smaller than an upper limit of the sub-range and the rest of the timing messages have phase-error indicators greater than or equal to the upper limit.

In a method according to an embodiment of the invention, one of the sub-ranges is such that a first predetermined portion of the timing messages have phase-error indicators smaller than a lower limit of the sub-range and a second predetermined portion of the timing messages have phase-error indicators greater than an upper limit of the sub-range.

A computer program according to an embodiment of the invention comprises software modules for controlling a programmable processor to control a clock signal generator. The software modules comprise computer executable instructions for controlling the programmable processor to:

form at least two mutually different control quantities on the basis of reception moments of timing messages transmitted by a single network element, the reception moments being expressed as time values based on a first clock signal and the timing messages being transmitted in accordance with a second clock signal, calculate a weighted sum of the at least two control quantities, and control the clock signal generator with the weighted sum of the control quantities so as to achieve synchronization between the first clock signal and the second clock signal.

The software modules can be, for example, subroutines and functions generated with a suitable programming language.

A computer program product according to an embodiment of the invention comprises a non-volatile computer readable medium, e.g. a compact disc ("CD"), encoded with the above-mentioned software modules.

A signal according to an embodiment of the invention is encoded to carry information defining a computer program according to an embodiment of the invention.

The specific examples provided in the description given above should not be construed as limiting. Therefore, the invention is not limited merely to the embodiments described above, many variants being possible.

What is claimed is:

1. A control device for controlling a clock signal generator, the control device comprising a processor for forming a control quantity on the basis of reception moments of timing messages, the reception moments being expressed as time values based on a first clock signal and the timing messages being transmitted in accordance with a second clock signal, wherein the processor is further configured to:

form at least one additional control quantity on the basis of the reception moments of the timing messages, calculate a weighted sum of the control quantity and the at least one additional control quantity, and control the clock signal generator with the weighted sum of the control quantities so as to achieve synchronization between the first clock signal and the second clock signal.

2. The control device according to claim 1, wherein the processor is further configured to:

measure a noise quantity for each of the control quantities, each noise quantity indicating amount of fluctuation in the related control quantity, and determine weights of the weighted sum on the basis of the noise quantities so that a greater weight corresponds to a smaller noise quantity and a smaller weight corresponds to a greater noise quantity.

3. The control device according to claim 1, wherein the processor is configured to calculate phase-error indicators on the basis of the reception moments of the timing messages and form the control quantities on the basis of the phase-error indicators, each phase-error indicator being a difference between the reception moment of the respective timing message and an ideal reception moment of that timing message.

4. The control device according to claim 3, wherein a sum of a constant phase-offset and a time-stamp value carried by each timing message is the ideal reception moment of that timing message.

5. The control device according to claim 3, wherein the ideal reception moments of the timing messages are temporally spaced at equal time intervals so that a time difference between any two successive ideal reception moments is constant.

6. The control device according to claim 3, wherein the processor is configured to filter a signal constituted by temporally successive phase-error indicators with a digital filter, an output quantity of the digital filter representing one of the control quantities.

7. The control device according to claim 3, wherein the processor is configured to select, from among a predetermined number of successively received timing messages, a timing message that has the smallest phase-error indicator as a signed value and thereby a smallest estimated transfer delay, and use the smallest phase-error indicator as one of the control quantities.

8. The control device according to claim 3, wherein a range of variation of the phase-error indicators is arranged to comprise one or more sub-ranges each of which being related to a sub-range specific control quantity that is one of the control quantities, and the processor is configured to determine, concerning each timing message, whether the respective phase-error indicator belongs to any of the sub-ranges, and use the phase-error indicator for forming the appropriate sub-range specific control quantity in response to a situation in which the phase-error indicator belongs to the corresponding sub-range.

9. The control device according to claim 8, wherein one of the one or more sub-ranges is such that a predetermined portion of the timing messages have phase-error indicators smaller than an upper limit of the sub-range and the rest of the timing messages have phase-error indicators greater than or equal to the upper limit.

10. The control device according to claim 8, wherein one of the one or more sub-ranges is such that a first predetermined portion of the timing messages have phase-error indicators smaller than a lower limit of the sub-range and a second predetermined portion of the timing messages have phase-error indicators greater than an upper limit of the sub-range.

11. The control device according to claim 1, wherein the processor is configured to carry out the forming of the control quantities for a flow of the timing messages transferred towards the control device and transmitted in accordance with the second clock signal and also for another flow of timing messages transferred in the opposite direction and transmitted in accordance with the first clock signal produced with the clock signal generator, and wherein the processor is configured to calculate a weighted sum of all the control quantities and control the clock signal generator with the weighted sum of all the control quantities.

12. The control device according to claim 1, wherein the processor is configured to carry out the forming of the control quantities for each of several flows of timing messages, and wherein the processor is configured to calculate a weighted sum of all the control quantities and control the clock signal generator with the weighted sum of all the control quantities.

13. A network element comprising:

at least one egress port and at least one ingress port for connecting to a data transfer network, a controllable clock signal generator, and a control device, wherein the control device comprises a processor for forming a control quantity on the basis of reception moments of timing messages, the reception moments being expressed as time values based on a first clock signal and the timing messages being transmitted in accordance with a second clock signal, wherein the processor is further configured to:

form at least one additional control quantity on the basis of the reception moments of the timing messages, calculate a weighted sum of the control quantity and the at least one additional control quantity, and control the controllable clock signal generator with the weighted sum of the control quantities so as to achieve synchronization between the first clock signal and the second clock signal.

14. The network element according to claim 13, wherein the network element is configured to receive the timing messages and the reception moments of the timing messages are expressed as time values based on a clock signal produced by the controllable clock signal generator, the clock signal produced by the controllable clock signal generator being the first clock signal.

15. The network element according to claim 13, wherein the network element is configured to transmit the timing messages in accordance with a clock signal produced by the controllable clock signal generator and receive information about the reception moments of the timing messages expressed as time values based on a reference clock signal prevailing at another network element receiving the timing messages, the clock signal produced by the controllable clock signal generator being the second clock signal.

16. The network element according to claim 13, wherein the control device is configured to carry out the forming of the control quantities for a flow of the timing messages transmitted from another network element to the network element in accordance with the second clock signal and also for another flow of timing messages transmitted in the opposite direction from the network element to the other network element in accordance with the first clock signal produced by the clock signal generator, and wherein the control device is configured to calculate a weighted sum of all the control quantities and control the controllable clock signal generator with the weighted sum of all the control quantities.

17. The network element according to claim 13, wherein the control device is configured to carry out the forming of the control quantities for each of several flows of timing messages transferred between the network device and several other network devices, and wherein the control device is configured to calculate a weighted sum of all the control quantities and control the clock signal generator with the weighted sum of all the control quantities.

18. The network element according to claim 13, wherein the network element is at least one of the following: an Internet Protocol ("IP") router, an Ethernet switch, a MultiProtocol Label Switching ("MPLS") switch.

19. A method for controlling a clock signal generator, the method comprising:
forming a control quantity on the basis of reception moments of timing messages, the reception moments being expressed as time values based on a first clock signal and the timing messages being transmitted in accordance with a second clock signal,
forming at least one additional control quantity on the basis of the reception moments of the timing messages,
calculating a weighted sum of the control quantity and the at least one additional control quantity, and
controlling the clock signal generator with the weighted sum of the control quantities so as to achieve synchronization between the first clock signal and the second clock signal.

20. A method according to claim 19, wherein the method further comprises:
measuring a noise quantity for each of the control quantities, each noise quantity indicating amount of fluctuation in the related control quantity, and
determining weights of the weighted sum on the basis of the noise quantities so that a greater weight corresponds to a smaller noise quantity and a smaller weight corresponds to a greater noise quantity.

21. The method according to claim 19, wherein the first clock signal is generated with the clock signal generator and the second clock signal is a reference clock signal prevailing at a network element which transmits the timing messages.

22. The method according to claim 19, wherein the second clock signal is generated with the clock signal generator and the method further comprises transmitting the timing messages and receiving information about the reception moments of the timing messages expressed as time values based on the first clock signal that is a reference clock signal prevailing at another network element that receives the timing messages.

23. The method according to claim 19, wherein the method comprises carrying out the forming of the control quantities for a flow of the timing messages transmitted from a master network element to a slave element in accordance with the second clock signal and also for another flow of timing messages transmitted in an opposite direction from the slave network element to the master network element in accordance with the first clock signal produced by the clock signal generator, and wherein the method comprises calculating a weighted sum of all the control quantities and controlling the clock signal generator with the weighted sum of all the control quantities.

24. The method according to claim 19, wherein the method comprises carrying out the forming of the control quantities for each of several flows of timing messages transferred between a slave network element and several master network elements, and wherein the method comprises calculating a weighted sum of all the control quantities and controlling the clock signal generator with the weighted sum of all the control quantities.

25. The method according to claim 19, wherein the method comprises calculating phase-error indicators on the basis of the reception moments of the timing messages and forming the control quantities on the basis of the phase-error indicators, each phase-error indicator being a difference between the reception moment of the respective timing message and an ideal reception moment of that timing message.

26. The method according to claim 25, wherein a sum of a constant phase-offset and a time-stamp value carried by each timing message is the ideal reception moment of that timing message.

27. The method according to claim 25, wherein the ideal reception moments of the timing messages are temporally spaced at equal time intervals so that a time difference between any two successive ideal reception moments is constant.

28. The method according to claim 25, wherein the method comprises filtering a signal constituted by temporally successive phase-error indicators with a digital filter, an output quantity of the digital filter representing one of the control quantities.

29. The method according to claim 25, wherein the method comprises selecting, from among a predetermined number of successively received timing messages, a timing message that has the smallest phase-error indicator as a signed value and thereby a smallest estimated transfer delay, and using the smallest phase-error indicator as one of the control quantities.

30. The method according to claim 25, wherein a range of variation of the phase-error indicators comprises one or more sub-ranges each of which being related to a sub-range specific control quantity that is one of the control quantities, and the method comprises determining, concerning each timing message, whether the respective phase-error indicator belongs to any of the sub-ranges, and using the phase-error indicator for forming the appropriate sub-range specific control quantity in response to a situation in which the phase-error indicator belongs to the corresponding sub-range.

31. The method according to claim 30, wherein one of the one or more sub-ranges is such that a predetermined portion of the timing messages have phase-error indicators smaller than an upper limit of the sub-range and the rest of the timing messages have phase-error indicators greater than or equal to the upper limit.

32. The method according to claim 30, wherein one of the one or more sub-ranges is such that a first predetermined portion of the timing messages have phase-error indicators smaller than a lower limit of the sub-range and a second predetermined portion of the timing messages have phase-error indicators greater than an upper limit of the sub-range.

33. A non-transitory computer readable medium encoded with a computer program for controlling a clock signal generator, the computer program comprising computer executable instructions for controlling a programmable processor to:
form a control quantity on the basis of reception moments of timing messages, the reception moments being expressed as time values based on a first clock signal and the timing messages being transmitted in accordance with a second clock signal,
form at least one additional control quantity on the basis of the reception moments of the timing messages,
calculate a weighted sum of the control quantity and the at least one additional control quantity, and
control the clock signal generator with the weighted sum of the control quantities so as to achieve synchronization between the first clock signal and the second clock signal.

* * * * *